(12) United States Patent
Sugai (10) Patent No.: US 11,988,201 B2
(45) Date of Patent: May 21, 2024

(54) ELECTROCHEMICAL COMPRESSOR

(71) Applicant: HONDA MOTOR CO., LTD., Tokyo (JP)

(72) Inventor: Satoshi Sugai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/112,550

(22) Filed: Feb. 22, 2023

(65) Prior Publication Data
US 2023/0304486 A1    Sep. 28, 2023

(30) Foreign Application Priority Data
Mar. 24, 2022    (JP) .................................. 2022-048111

(51) Int. Cl.
| | | |
|---|---|---|
| F04B 43/04 | (2006.01) | |
| C25B 9/19 | (2021.01) | |
| F04B 19/00 | (2006.01) | |
| F04B 45/047 | (2006.01) | |
| B01D 53/32 | (2006.01) | |
| C25B 1/02 | (2006.01) | |
| C25B 9/60 | (2021.01) | |

(52) U.S. Cl.
CPC ............ *F04B 43/04* (2013.01); *F04B 45/047* (2013.01); *B01D 53/32* (2013.01); *B01D 53/326* (2013.01); *C25B 1/02* (2013.01); *C25B 9/19* (2021.01); *C25B 9/60* (2021.01); *F04B 19/006* (2013.01)

(58) Field of Classification Search
CPC ...... F04B 43/04; F04B 45/047; F04B 19/006; B01D 53/32; B01D 53/326; C25B 1/02; C25B 9/19; C25B 9/60
See application file for complete search history.

(56) References Cited

U.S. PATENT DOCUMENTS

| | | | |
|---|---|---|---|
| 2009/0136789 A1* | 5/2009 | Pien | H01M 8/0245 429/514 |
| 2011/0198217 A1* | 8/2011 | Nakazawa | C25B 9/77 204/252 |
| 2018/0187319 A1 | 7/2018 | Yakumaru et al. | |
| 2018/0265994 A1 | 9/2018 | Yamagiwa et al. | |
| 2021/0285427 A1* | 9/2021 | Nakaue | C25B 1/02 |
| 2022/0298656 A1* | 9/2022 | Takasugi | C25B 1/02 |

FOREIGN PATENT DOCUMENTS

| | | |
|---|---|---|
| JP | 2018-109221 A | 7/2018 |
| JP | 2018-154865 A | 10/2018 |

* cited by examiner

*Primary Examiner* — Charles G Freay
(74) *Attorney, Agent, or Firm* — Carrier, Shende & Associates P.C.; Joseph P. Carrier; Fulchand P. Shende (57) ABSTRACT

An anode current collector of an electrochemical compressor includes a plurality of first portions and a plurality of second portions that are alternately arranged from the first end portion toward an inner side in a plane direction of the anode current collector. In the first portion, a first porous body, a second porous body, and a third porous body are sequentially stacked. In the second portion, the first portion, the third porous body, and the second porous body are sequentially stacked. The porosity of the second porous body is larger than the porosity of the first porous body and the porosity of the third porous body is larger than the porosity of the second porous body.

4 Claims, 9 Drawing Sheets

ELECTROCHEMICAL COMPRESSOR

CROSS-REFERENCE TO RELATED APPLICATIONS

This application is based upon and claims the benefit of priority from Japanese Patent Application No. 2022-048111 filed on Mar. 24, 2022, the contents of which are incorporated herein by reference.

BACKGROUND OF THE INVENTION

Field of the Invention

The present invention relates to an electrochemical compressor.

Description of the Related Art

An electrochemical compressor is provided with an electrolyte membrane, a cathode electrode provided on one surface of the electrolyte membrane, and an anode electrode provided on the other surface of the electrolyte membrane. The anode electrode includes an anode catalyst layer and an anode current collector. Voltage is applied between the cathode electrode and the anode electrode in a state in which hydrogen gas containing water vapor is supplied to the anode current collector, whereby high-pressure hydrogen gas is generated at the cathode electrode As for an electrochemical compressor of this type, for example, JP 2018-109221 A discloses an anode gas diffusion layer (anode current collector) made up from a stacked body formed by stacking a plurality of metal sheets with a plurality of vent holes.

SUMMARY OF THE INVENTION

In the case of the electrochemical compressor, the temperature of a central portion of the electrolyte membrane is higher than that of the outer peripheral portion. In this case, when the supply amount of water vapor is adjusted so that the central portion of the electrolyte membrane is not dried, liquid water is likely to stay between the outer peripheral portion of the electrolyte membrane and the outer peripheral portion of the anode current collector. Then, the retained water hinders the supply of hydrogen gas to the anode catalyst layer, and thus there is a possibility that the electrochemical reaction will be inhibited at the outer peripheral portion of the anode catalyst layer.

An object of the present invention is to solve the aforementioned problems.

One aspect of the present invention is an electrochemical compressor including: an electrolyte membrane; a cathode electrode provided on one surface of the electrolyte membrane; and an anode electrode provided on another surface of the electrolyte membrane, wherein the anode electrode includes an anode catalyst layer and an anode current collector, a voltage is applied between the cathode electrode and the anode electrode in a state in which hydrogen gas containing water is supplied to the anode current collector, whereby high-pressure hydrogen gas having pressure higher than the hydrogen gas is generated at the cathode electrode, the electrochemical compressor further comprising a flow path member that allows the hydrogen gas to flow from a first end portion to a second end portion of an outer periphery of the anode current collector in a surface direction of the anode current collector, wherein the anode current collector includes a first surface facing in a direction in which the anode catalyst layer is positioned, and a second surface facing in a direction opposite to the direction in which the anode catalyst layer is positioned, the anode current collector includes a plurality of first portions in each of which a first porous body, a second porous body, and a third porous body are sequentially stacked from the first surface toward the second surface, and a plurality of second portions in each of which the first porous body, the third porous body, and the second porous body are sequentially stacked from the first surface toward the second surface, a porosity of the second porous body is larger than a porosity of the first porous body, a porosity of the third porous body is larger than the porosity of the second porous body, and the plurality of first portions and the plurality of second portions are alternately arranged from the first end portion toward an inner side in the surface direction of the anode current collector.

According to the present invention, the porosity of the second porous body is larger than the porosity of the first porous body, and the porosity of the third porous body is larger than the porosity of the second porous body. Therefore, at the anode current collector, the hydrogen gas tends to flow into the third porous body. Further, the position of the third porous body in the second portion is closer to the anode catalyst layer than the position of the third porous body in the first portion. Further, the first portion and the second portion are alternately arranged from the first end portion toward the inner side in the plane direction of the anode current collector.

In this case, when the hydrogen gas flows from the first portion to the second portion, a flow (first flow) of the hydrogen gas in the direction toward the anode catalyst layer is generated. When the hydrogen gas flows from the second portion to the first portion, a flow (second flow) of the hydrogen gas in the direction away from the anode catalyst layer is generated. That is, the first flow and the second flow are alternately generated from the first end portion toward the inner side in the plane direction of the anode current collector. The first flow supplies the hydrogen gas to the anode catalyst layer. The second flow guides the liquid water generated between the anode current collector and the electrolyte membrane to an inner hole of the anode current collector. Therefore, the liquid water generated between the outer peripheral portion of the electrolyte membrane and the outer peripheral portion of the anode current collector is carried to the central portion of the electrolyte membrane by the hydrogen gas flowing through the anode current collector. As a result, it is possible to suppress the retention of liquid water between the outer peripheral portion of the anode current collector and the electrolyte membrane, resulting in that it can be prevented that the electrochemical reactions at the outer peripheral portion of the anode catalyst layer are inhibited by the retained water.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
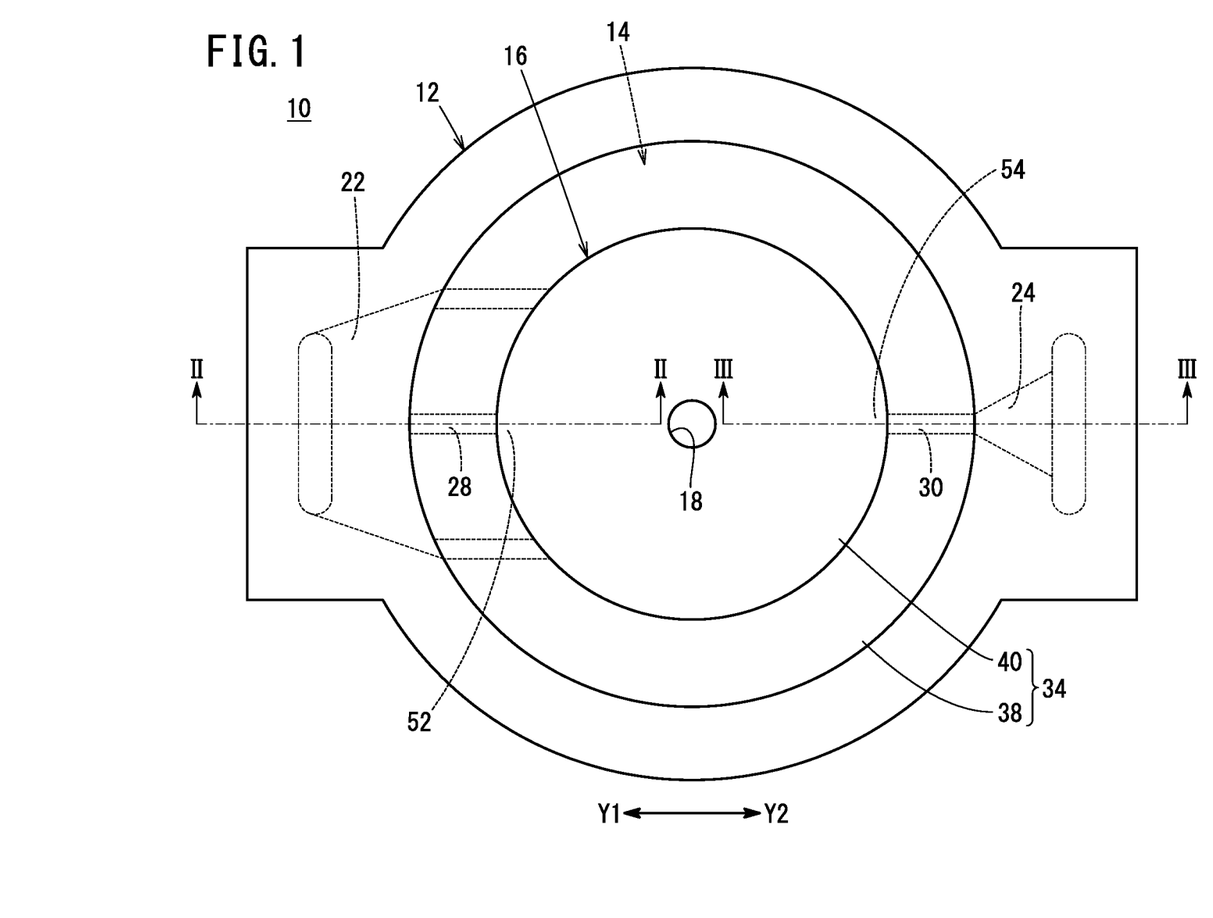
FIG. 1 is a schematic plan view of an electrochemical compressor according to an embodiment of the present invention.

As shown in FIG. 1, an electrochemical compressor 10 (hereinafter simply referred to as "compressor 10") according to an embodiment of the present invention compresses (raises a pressure of) a low-pressure hydrogen gas supplied from a hydrogen tank or the like (not shown) to a high-pressure hydrogen gas through electrochemical reactions. A plurality of compressors 10 are stacked to constitute a compressor stack (not shown). A compressing load (clamping load) along the arrow X direction is applied to the compressor 10 (see FIG. 2).

Figure 2:
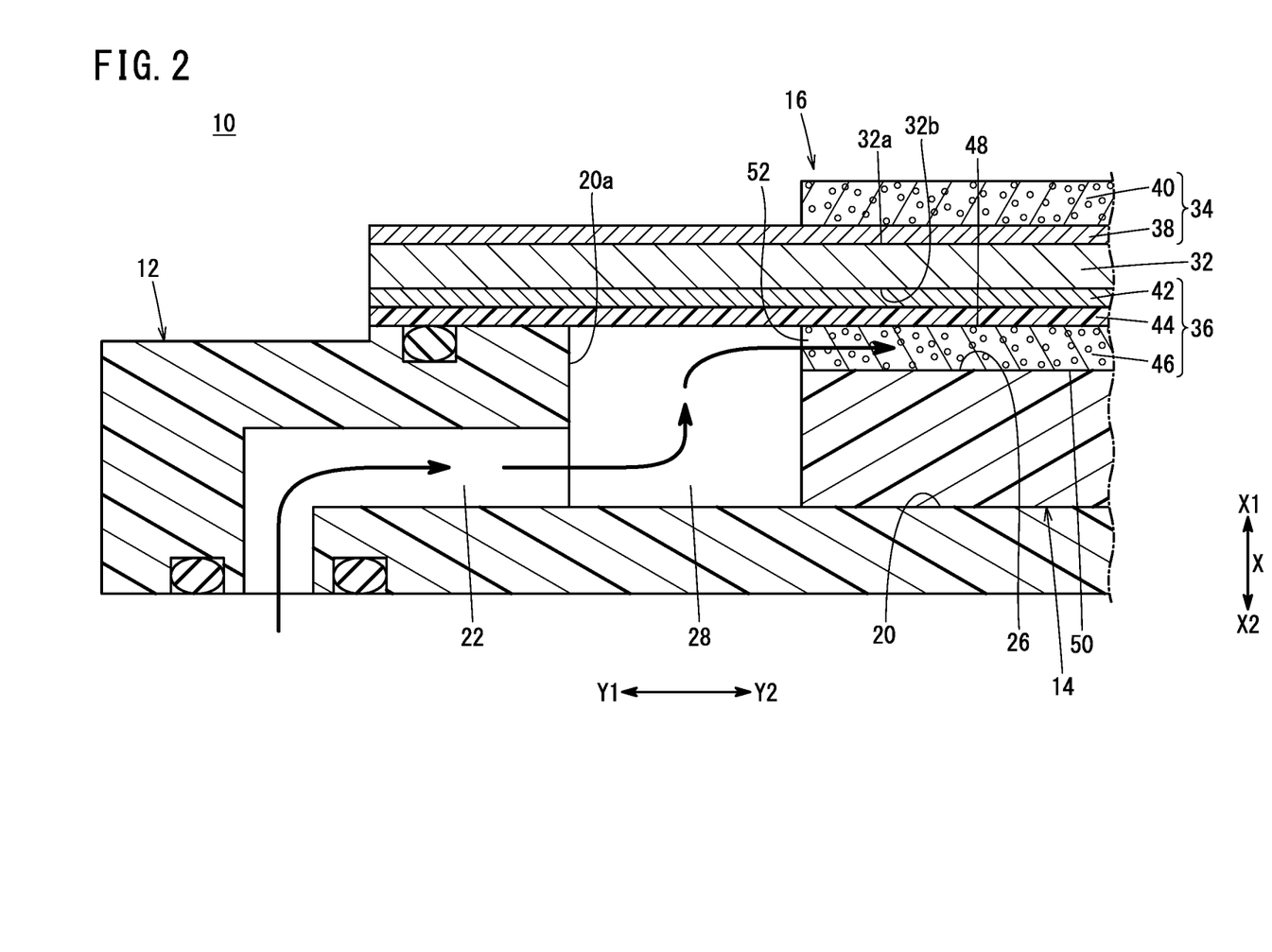
FIG. 2 is a longitudinal cross-sectional view taken along line II-II of FIG. 1.
Figure 3:
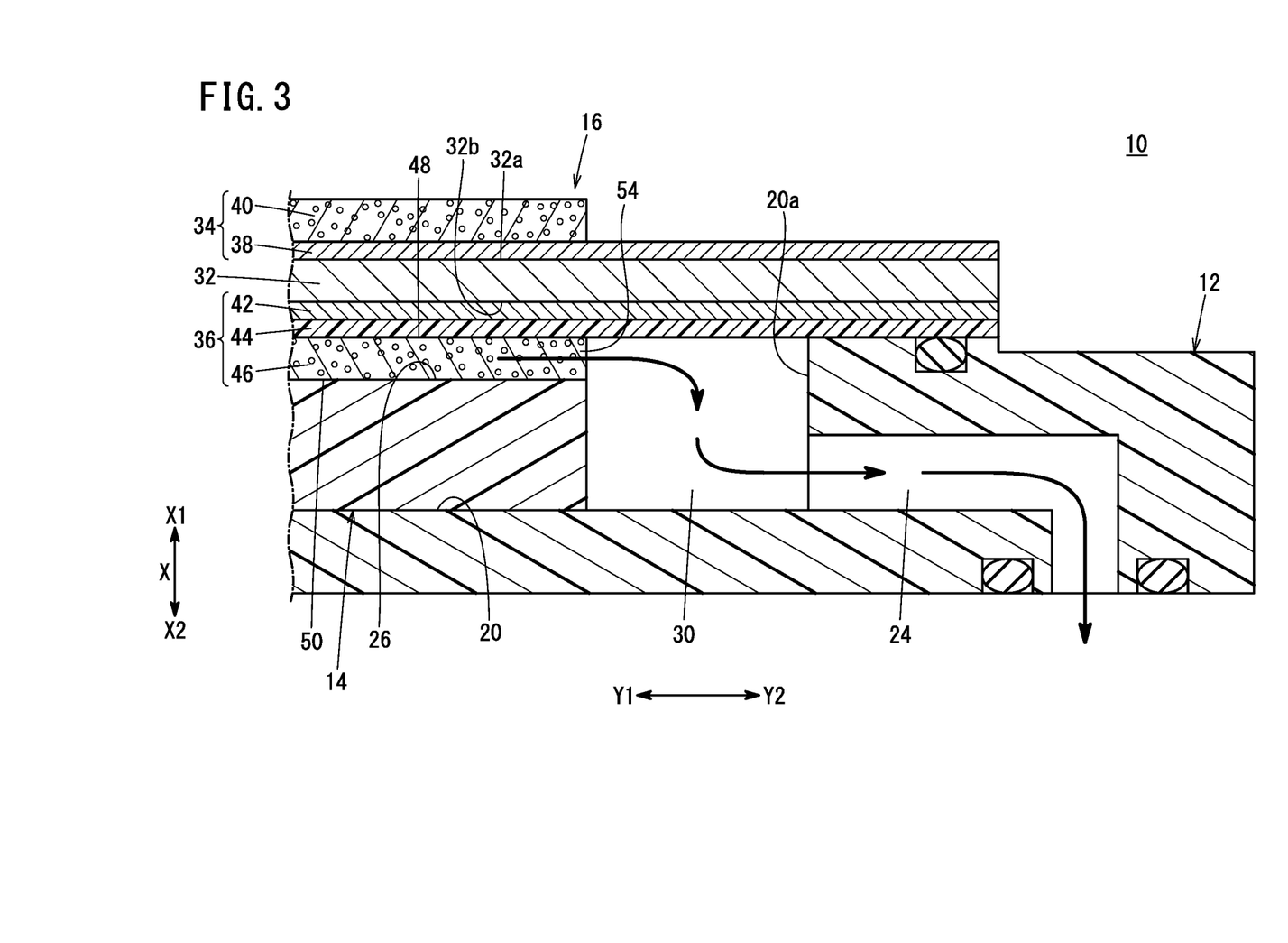
FIG. 3 is a longitudinal cross-sectional view taken along line III-III of FIG. 1.

In FIGS. 1 to 3, the compressor 10 includes a support member 12, a flow path member 14, and an MEA 16 (Membrane Electrode Assembly). The compressor 10 has a pair of separators (not shown) for sandwiching the support member 12, the flow path member 14, and the MEA 16 in the direction of arrow X. A hydrogen gas discharge flow path 18 for discharging high-pressure hydrogen gas is formed through a central portion of the compressor 10 in the arrow X direction (see FIG. 1).

The support member 12 is a plate-like member. The support member 12 is made of, for example, a resin material. At a central portion of one surface (surface in the arrow X1 direction) of the support member 12, a first recess 20 having a circular shape in which the flow path member 14 is disposed is formed (see FIGS. 2 and 3). An inlet flow path 22 and an outlet flow path 24 are formed at an outer peripheral portion of the support member 12.

As shown in FIG. 2, the inlet flow path 22 opens on another surface (surface in the arrow X2 direction) of the support member 12. The inlet flow path 22 is located at an end portion of the support member 12 in the direction of arrow Y1. The inlet flow path 22 opens on an inner side surface 20a of the first recess 20. The inlet flow path 22 is a hole for introducing a low-pressure hydrogen gas containing water vapor (moisture) into the MEA 16.

As shown in FIG. 3, the outlet flow path 24 is positioned at an end portion of the support member 12 in the arrow Y2 direction. The outlet flow path 24 opens on the inner side surface 20a of the first recess 20. The outlet flow path 24 is located at a place being displaced from the inlet flow path 22 by 180° in the circumferential direction of the first recess 20 (see FIG. 1). In other words, the inlet flow path 22 and the outlet flow path 24 are positioned so as to sandwich the hydrogen gas discharge flow path 18. The outlet flow path 24 is open on another surface of the support member 12.

In FIGS. 2 and 3, the flow path member 14 is disposed in the first recess 20 of the support member 12. A circular second recess 26 is formed at a central portion of an arrow-X1-direction surface of the flow path member 14. An anode current collector 46 described later is disposed in the second recess 26. A plurality of supply flow paths 28 and a discharge flow path 30 are formed at an outer periphery of the flow path member 14.

As shown in FIGS. 1 and 2, the plurality of supply flow paths 28 communicate with the inlet flow path 22. The plurality of supply flow paths 28 introduce hydrogen gas containing water vapor to a first end portion 52 of the outer periphery of the anode current collector 46. As shown in FIGS. 1 and 3, the discharge flow path 30 communicates with the outlet flow path 24. The discharge flow path 30 guides the exhaust gas coming from a second end portion 54 of the outer periphery of the anode current collector 46 to the outlet flow path 24.

In FIGS. 2 and 3, the MEA 16 includes an electrolyte membrane 32, a cathode electrode 34, and an anode electrode 36. The MEA 16 electrochemically compresses hydrogen gas supplied to the anode electrode 36 and generates high-pressure hydrogen gas at the cathode electrode 34.

The electrolyte membrane 32 has hydrogen ion conductivity (proton conductivity). The electrolyte membrane 32 is, for example, a solid polymer electrolyte membrane (cation exchange membrane). The solid polymer electrolyte membrane is, for example, a thin membrane of perfluorosulfonic acid containing water. The electrolyte membrane 32 is sandwiched between the anode electrode 36 and the cathode electrode 34. As the electrolyte membrane 32, a hydrocarbon (HC) electrolyte can be used in addition to a fluorine-based electrolyte.

The cathode electrode 34 is provided on one surface 32a (in the arrow X1 direction) of the electrolyte membrane 32. The cathode electrode 34 includes a cathode catalyst layer 38 and a cathode current collector 40. The cathode catalyst layer 38 is bonded to the surface 32a of the electrolyte membrane 32. The cathode catalyst layer 38 is made up from, for example, a carbon porous body carrying catalyst particles such as platinum. The cathode current collector 40 also serves as a gas diffusion layer for deriving the high-pressure hydrogen gas generated in the cathode catalyst layer 38.

The anode electrode 36 is provided on another surface 32b (in the arrow X2 direction) of the electrolyte membrane 32. The anode electrode 36 includes an anode catalyst layer 42, a protective sheet 44, and an anode current collector 46. The anode catalyst layer 42 is bonded to the surface 32b of the electrolyte membrane 32. The anode catalyst layer 42 is configured, for example, similarly to the cathode catalyst layer 38. The anode current collector 46 also serves as a gas diffusion layer for supplying hydrogen gas containing water vapor to the anode catalyst layer 42. That is, the anode current collector 46 is a porous member.

The protective sheet 44 is disposed between the anode catalyst layer 42 and the anode current collector 46. The protective sheet 44 prevents the electrolyte membrane 32 from being pressed and damaged by the anode current collector 46 (porous member) because of the high-pressure hydrogen gas generated in the cathode catalyst layer 38. The protective sheet 44 is configured to be permeable to hydrogen gas containing water vapor.

The anode current collector 46 includes a first surface 48 facing toward the anode catalyst layer 42 (the arrow X1 direction) and a second surface 50 facing away from the anode catalyst layer 42 (the arrow X2 direction).

Figure 4:
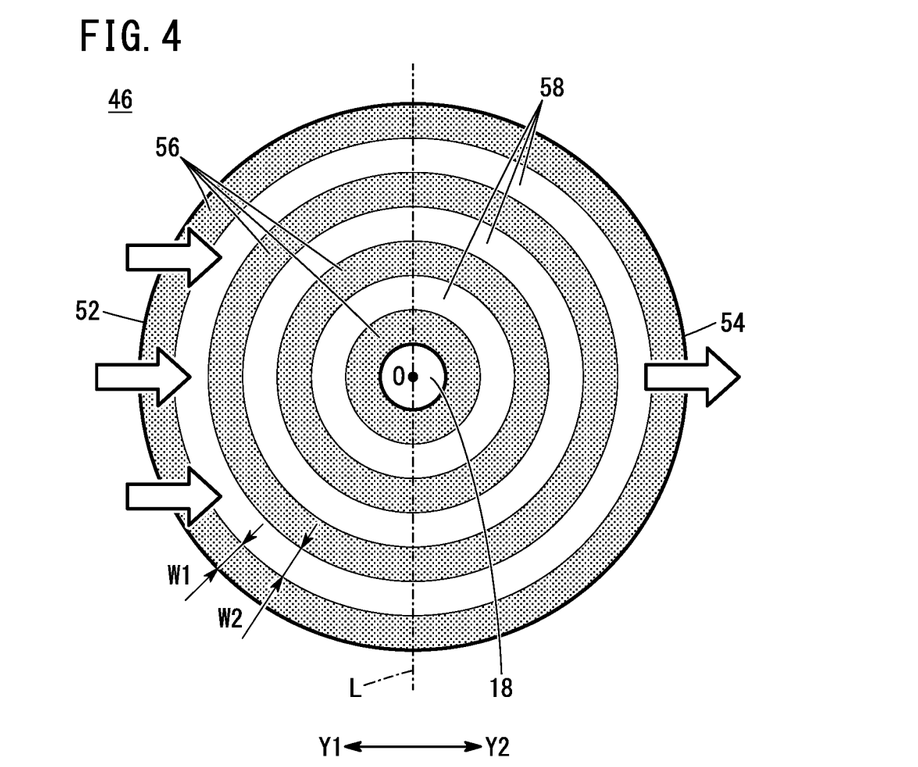
FIG. 4 is a plan explanatory view of an anode current collector shown in FIG. 2 viewed from the thickness direction.

As shown in FIG. 4, the anode current collector 46 has a circular shape. The outer periphery of the anode current collector 46 has the first end portion 52 and the second end portion 54. The first end portion 52 is an end portion of the anode current collector 46 in the arrow Y1 direction. The second end portion 54 is an end portion of the anode current collector 46 in the arrow Y2 direction. The first end portion 52 and the second end portion 54 are positioned so as to sandwich the hydrogen gas discharge flow path 18.

In other words, of the outer periphery of the anode current collector 46, the first end portion 52 is positioned in the arrow Y1 direction with respect to the line segment L. The line segment L is orthogonal to the thickness direction (the arrow X direction) of the anode current collector 46 and the arrow Y1 direction and passes through the center point O of the anode current collector 46. The first end portion 52 extends in a range of 180° or less in the circumferential direction of the anode current collector 46. Of the outer periphery of the anode current collector 46, the second end portion 54 is in the arrow Y2 direction with respect to the line segment L. The second end portion 54 extends in a range of 180° or less in the circumferential direction of the anode current collector 46.

Hydrogen gas containing water vapor is introduced to the first end portion 52 from a plurality of supply flow paths 28 (see FIG. 2). The exhaust gas flowing through the anode current collector 46 is discharged from the second end portion 54 to the discharge flow path 30 (see FIG. 3).

The anode current collector 46 includes a plurality of first portions 56 and a plurality of second portions 58. Each first portion 56 is an annular portion the center of which is a center point O of the anode current collector 46. The plurality of first portions 56 have different diameters. Each second portion 58 is an annular portion the center of which is the center point O of the anode current collector 46. The plurality of second portions 58 have different diameters.

The plurality of first portions 56 and the plurality of second portions 58 are alternately arranged radially inward of the anode current collector 46. In other words, the plurality of first portions 56 and the plurality of second portions 58 are alternately arranged from the first portion 56 toward the inner side (the arrow Y2 direction) of the surface of the anode current collector 46. The plurality of first portions 56 and the plurality of second portions 58 are alternately arranged from the central portion of the anode current collector 46 toward the second end portion 54 (the arrow Y2 direction). The first portion 56 and the second portion 58 are adjacent to each other in the radial direction of the anode current collector 46.

First widths W1 of the plurality of first portions 56 are equal to each other. The first width W1 is the length of the first portion 56 along the direction in which the first portion 56 and the second portion 58 are arranged. In other words, the first width W1 is the length of the first portion 56 along the radial direction of the anode current collector 46. Second widths W2 of the plurality of second portions 58 are equal to each other. The second width W2 is the length of the second portion 58 along the direction in which the first portion 56 and the second portion 58 are arranged. In other words, the second width W2 is the length of the second portion 58 along the radial direction of the anode current collector 46. The second width W2 of each second portion 58 is equal to the first width W1 of each first portion 56. However, the second width W2 of each second portion 58 may be larger or smaller than the first width W1 of each first portion 56.

Figure 5:
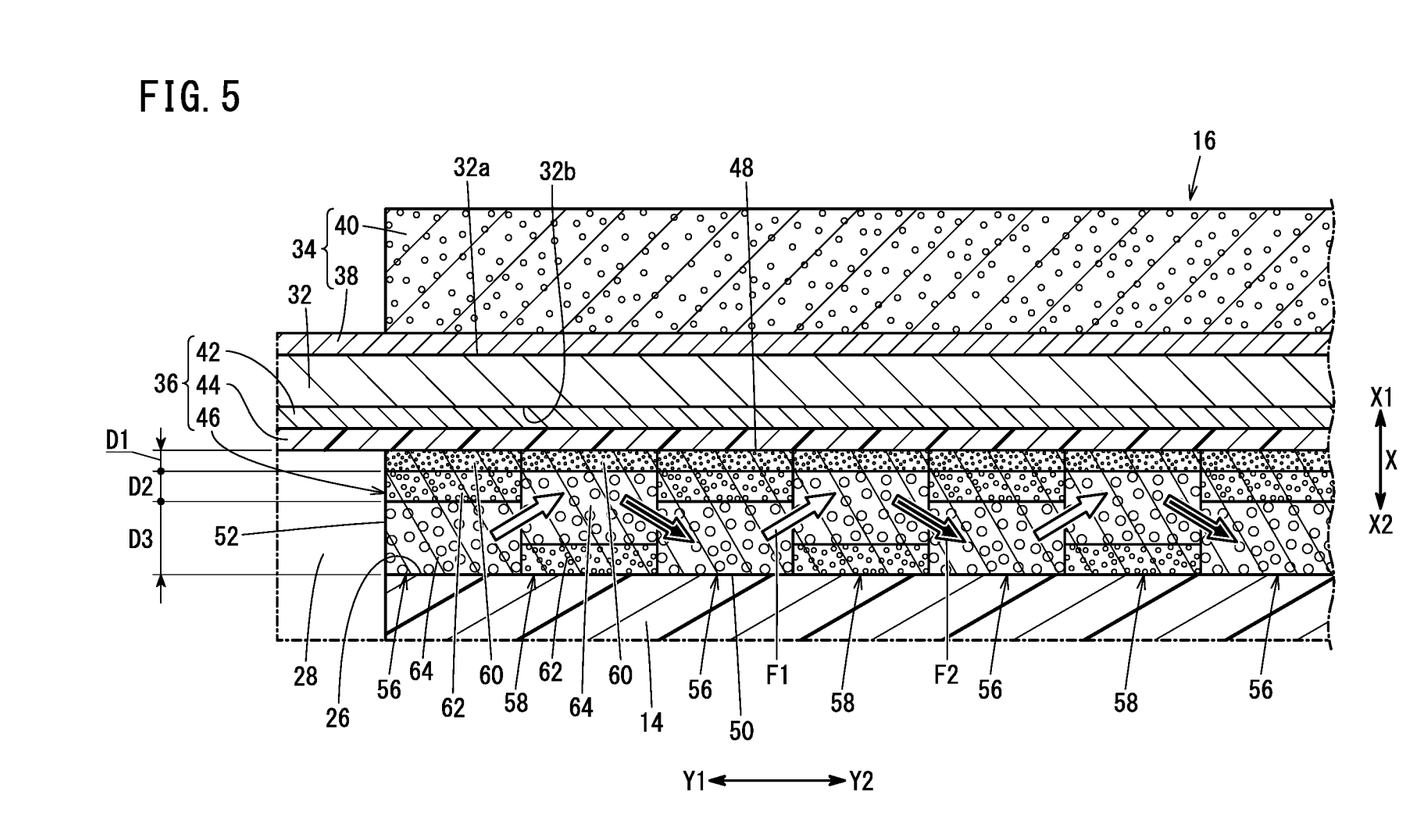
FIG. 5 is a first cross-sectional explanatory view of an anode current collector shown in FIG. 1.
Figure 6:
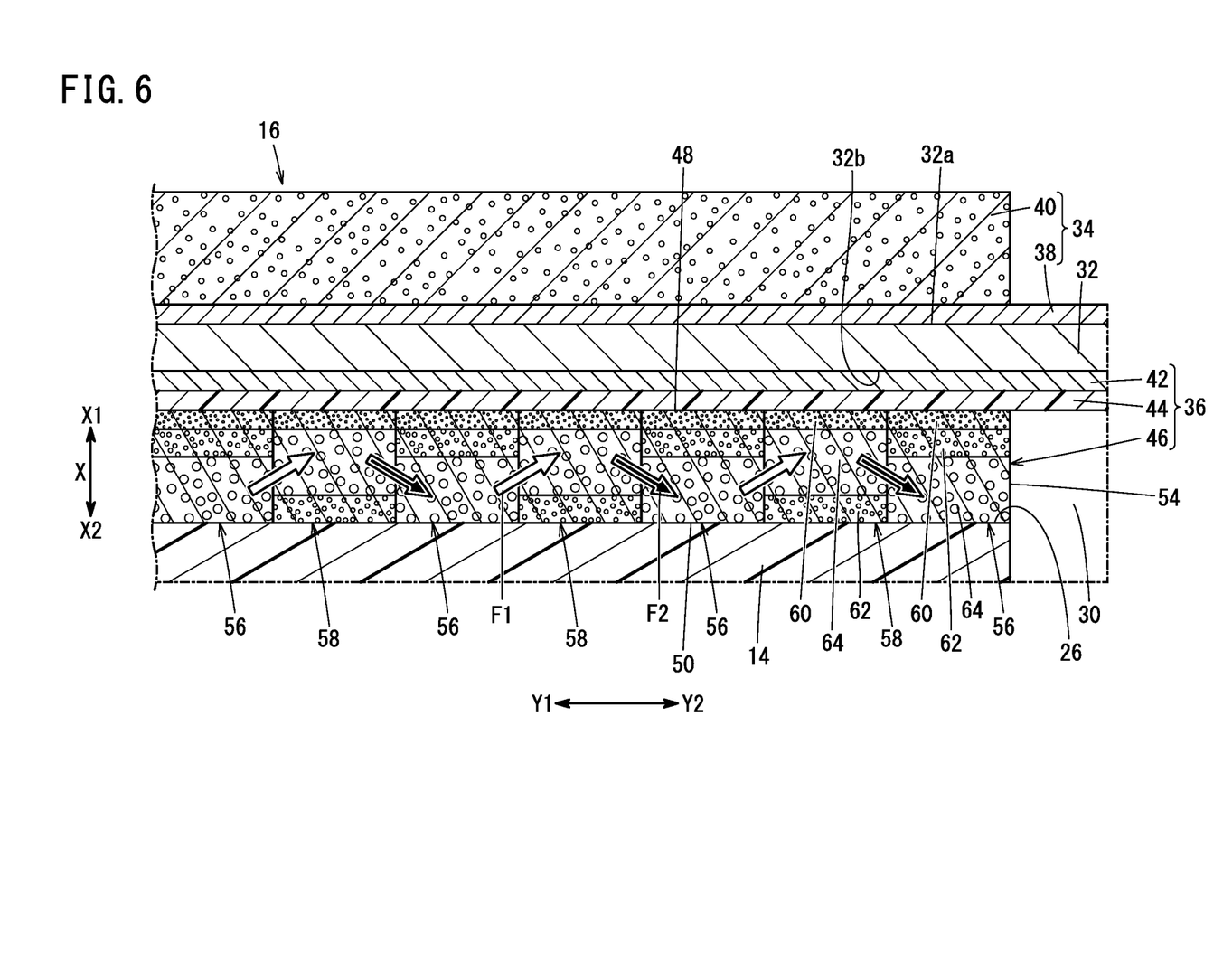
FIG. 6 is a second cross-sectional explanatory view of an anode current collector shown in FIG. 1.

In FIGS. 5 and 6, the thickness (the length along the arrow X direction) of the first portion 56 is equal to the thickness (the length along the arrow X direction) of the second portion 58. The first portion 56 is formed by stacking a first porous body 60, a second porous body 62 and a third porous body 64 sequentially from the first surface 48 toward the second surface 50. Each of the first porous body 60, the second porous body 62, and the third porous body 64 is a mesh member.

The porosity of the second porous body 62 is larger than the porosity of the first porous body 60. The porosity of the third porous body 64 is larger than the porosity of the second porous body 62. The thickness D2 (the length along the arrow X direction) of the second porous body 62 is larger than the thickness D1 (the length along the arrow X direction) of the first porous body 60. The thickness D3 (the length along the arrow X direction) of the third porous body 64 is larger than the thickness D2 of the second porous body 62.

The outer diameter of mesh lines forming the second porous body 62 is larger than the outer diameter of mesh lines forming the first porous body 60. The outer diameter of mesh lines forming the third porous body 64 is larger than the outer diameter of the mesh lines forming the second porous body 62.

The first porous body 60 is a dense layer having the porosity smaller than the porosity of each of the second porous body 62 and the third porous body 64. Thus, the first porous body 60 can prevent the protective sheet 44 from being deformed by the anode current collector 46 pressing the protective sheet 44 with the high-pressure hydrogen gas.

The second porous body 62 is an intermediate layer having the porosity that is larger than the porosity of the first porous body 60 and smaller than the porosity of the third porous body 64. As a result, deformation of the first porous body 60, which is a dense layer, pressed by the third porous body 64 can be suppressed by the second porous body 62. Hydrogen gas containing water vapor flows more easily in the second porous body 62 than in the first porous body 60.

The third porous body 64 is a strength layer that receives the pressing force of the high-pressure hydrogen gas. The third porous body 64 has the porosity larger than the porosity of each of the first porous body 60 and the second porous body 62. Therefore, hydrogen gas containing water vapor flows more easily in the third porous body 64 than in the first porous body 60 and the second porous body 62.

The second portion 58 is formed by stacking the first porous body 60, the third porous body 64, and the second porous body 62 sequentially from the first surface 48 toward the second surface 50. That is, the first portion 56 and the second portion 58 have the same configuration except that the positions of the second porous body 62 and the third porous body 64 are interchanged. As for the adjacent first portion 56 and second portion 58, the third porous body 64 of the first portion 56 and the third porous body 64 of the second portion 58 adjoin each other (overlap each other in the surface direction of the anode current collector 46).

The compressor 10 thus configured operates as follows.

As shown in FIG. 2, the hydrogen gas containing water vapor is introduced from the inlet flow path 22 of the compressor 10 to the first end portion 52 of the anode current collector 46 through the supply flow path 28. As shown in FIGS. 4 to 6, the hydrogen gas introduced to the first end portion 52 of the anode current collector 46 is supplied to the anode catalyst layer 42, flowing from the first end portion 52 to the second end portion 54 of the anode current collector 46.

Specifically, the hydrogen gas flows alternately through the first portion 56 and the second portion 58 from the first end portion 52 toward the second end portion 54 of the anode current collector 46. At this time, the hydrogen gas tends to flow into the third porous body 64 of the first portion 56 and the third porous body 64 of the second portion 58.

Therefore, as shown in FIGS. 5 and 6, when the hydrogen gas flows from the first portion 56 to the second portion 58, a flow of the hydrogen gas (first flow F1) in the direction toward the anode catalyst layer 42 (the arrow X1 direction) is generated. Further, when the hydrogen gas flows from the second portion 58 to the first portion 56, a flow (second flow F2) of the hydrogen gas in the direction (the arrow X2 direction) away from the anode catalyst layer 42 is generated. That is, the first flow F1 and the second flow F2 are alternately generated from the first end portion 52 toward the inner side in the surface direction of the anode current collector 46. The first flow F1 guides hydrogen gas to the anode catalyst layer 42. The second flow F2 guides liquid water generated between the anode current collector 46 and the electrolyte membrane 32 to the inner hole of the anode current collector 46.

In this case, the liquid water generated between the first end portion 52 of the anode current collector 46 and the outer peripheral portion of the electrolyte membrane 32 is carried to the central portion of the electrolyte membrane 32 by the hydrogen gas flowing through the anode current collector 46 (see FIG. 5). Thus, it is possible to humidify the central portion of the electrolyte membrane 32 can be while reducing the amount of liquid water remaining between the first end portion 52 of the anode current collector 46 and the outer peripheral portion of the electrolyte membrane 32. Further, liquid water generated between the second end portion 54 of the anode current collector 46 and the outer peripheral portion of the electrolyte membrane 32 is easily discharged into the discharge flow path 30 by the second flow F2 of the anode current collector 46 (see FIG. 6). Therefore, a water content distribution of the electrolyte membrane 32 can be made uniform, and it is possible to suppress the retention of liquid water between the outer peripheral portion of the anode current collector 46 and the outer peripheral portion of the electrolyte membrane 32.

When a voltage is applied between the anode current collector 46 and the cathode current collector 40, the supplied hydrogen gas is converted into protons (hydrogen ions) through electrochemical reactions at the anode catalyst layer 42. Protons generated at the anode catalyst layer 42 pass through the electrolyte membrane 32 and are guided to the cathode catalyst layer 38. At the cathode catalyst layer 38, protons coming from the electrolyte membrane 32 are converted into high-pressure hydrogen gas through electrochemical reactions. The high-pressure hydrogen gas generated at the cathode catalyst layer 38 is discharged to an external pipe (not shown) via the hydrogen gas discharge flow path 18 (see FIG. 1).

Unreacted hydrogen gas (hydrogen gas not consumed at the anode catalyst layer 42) and the water vapor that have passed through the anode current collector 46 are discharged as exhaust gas to the outlet flow path 24 via the discharge flow path 30 together with the liquid water generated at the anode current collector 46. The unreacted hydrogen gas discharged from the outlet flow path 24, for example, flows again into the inlet flow path 22 and is reused.

The present embodiment provides the following effects.

According to the present embodiment, the porosity of the second porous body 62 is larger than the porosity of the first porous body 60, and the porosity of the third porous body 64 is larger than the porosity of the second porous body 62. Therefore, at the anode current collector 46, the hydrogen gas tends to flow into the third porous body 64. Further, the position of the third porous body 64 in the second portion 58 is closer to the anode catalyst layer 42 than the position of the third porous body 64 in the first portion 56. Further, the first portion 56 and the second portion 58 are alternately arranged from the first end portion 52 toward the inner side in the surface direction of the anode current collector 46.

In this case, the liquid water generated between the outer peripheral portion of the electrolyte membrane 32 and the outer peripheral portion of the anode current collector 46 is carried to the central portion of the electrolyte membrane 32 by the hydrogen gas flowing through the anode current collector 46. Thus, the retention of liquid water between the outer peripheral portion of the anode current collector 46 and the electrolyte membrane 32 can be suppressed, resulting in that it can be prevented that the electrochemical reactions at the outer peripheral portion of the anode catalyst layer 42 are inhibited by the retained water.

In the stacking direction of the first porous body 60, the second porous body 62 and the third porous body 64, the thickness D3 of the third porous body 64 is larger than the thickness D2 of the second porous body 62.

According to such a configuration, the third porous body 64 of the first portion 56 and the third porous body 64 of the second portion 58 can adjoin each other. Thus, the first flow F1 and the second flow F2 can be efficiently generated.

Each of the plurality of first portions 56 extends annularly. Each of the plurality of second portions 58 extends annularly.

According to such a configuration, the configuration of the anode current collector 46 can be simplified.

(Modified Example)

Figure 7:
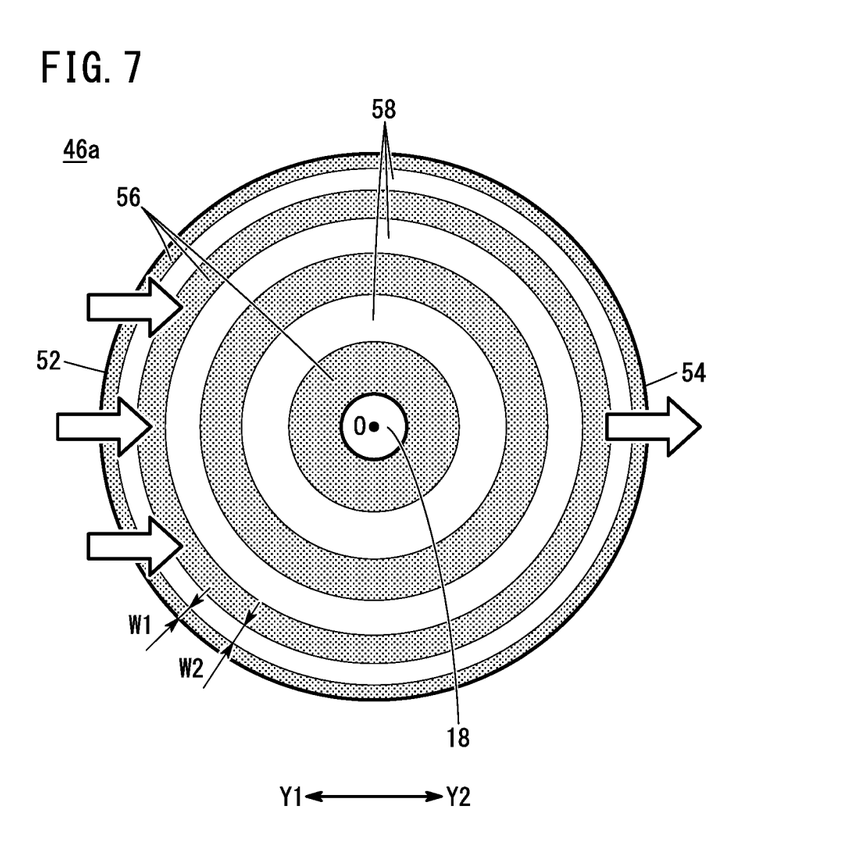
FIG. 7 is a plan explanatory view of an anode current collector according to a modified example viewed from the thickness direction.
Figure 8:
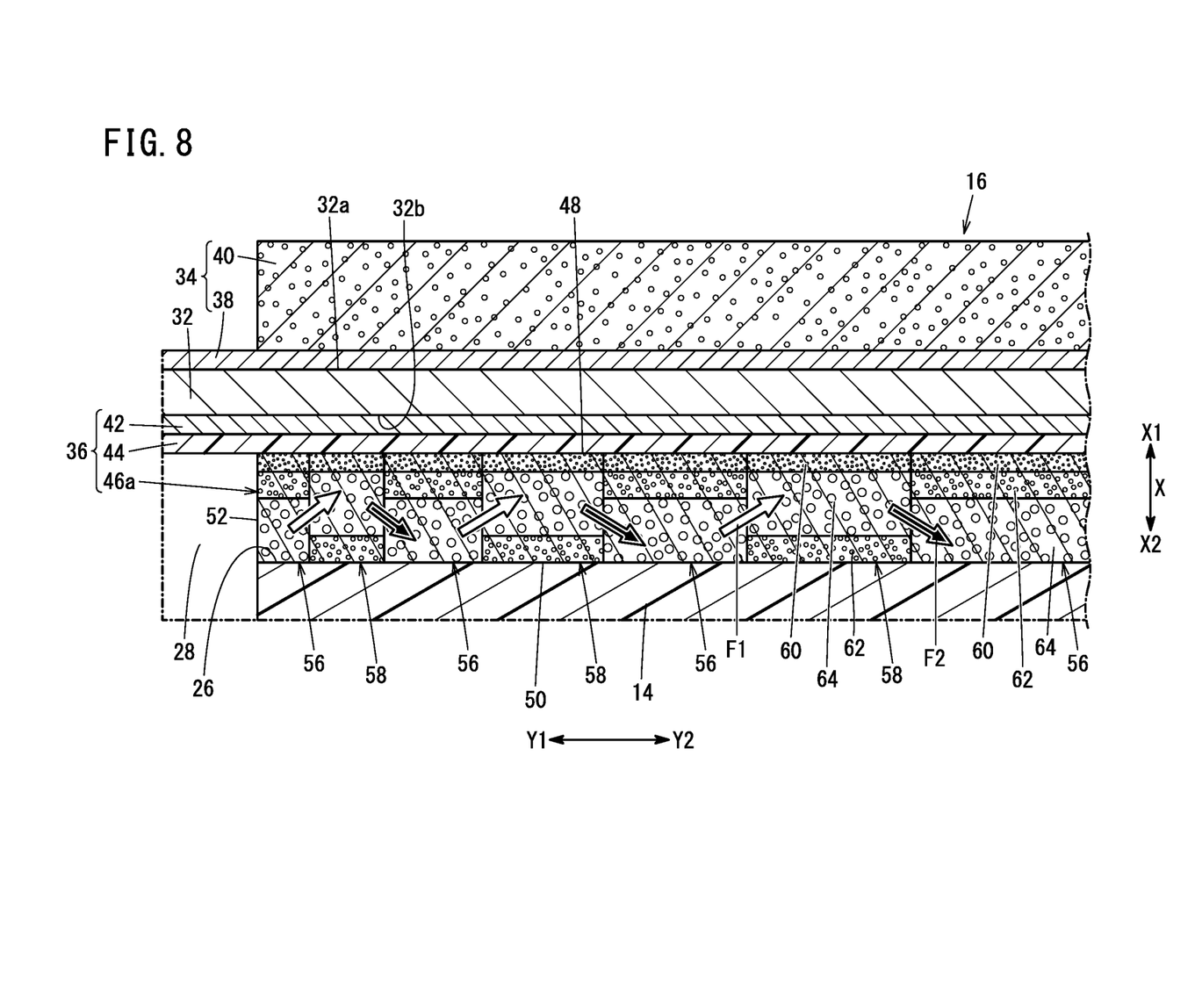
FIG. 8 is a first cross-sectional explanatory view of an anode current collector shown in FIG. 7.
Figure 9:
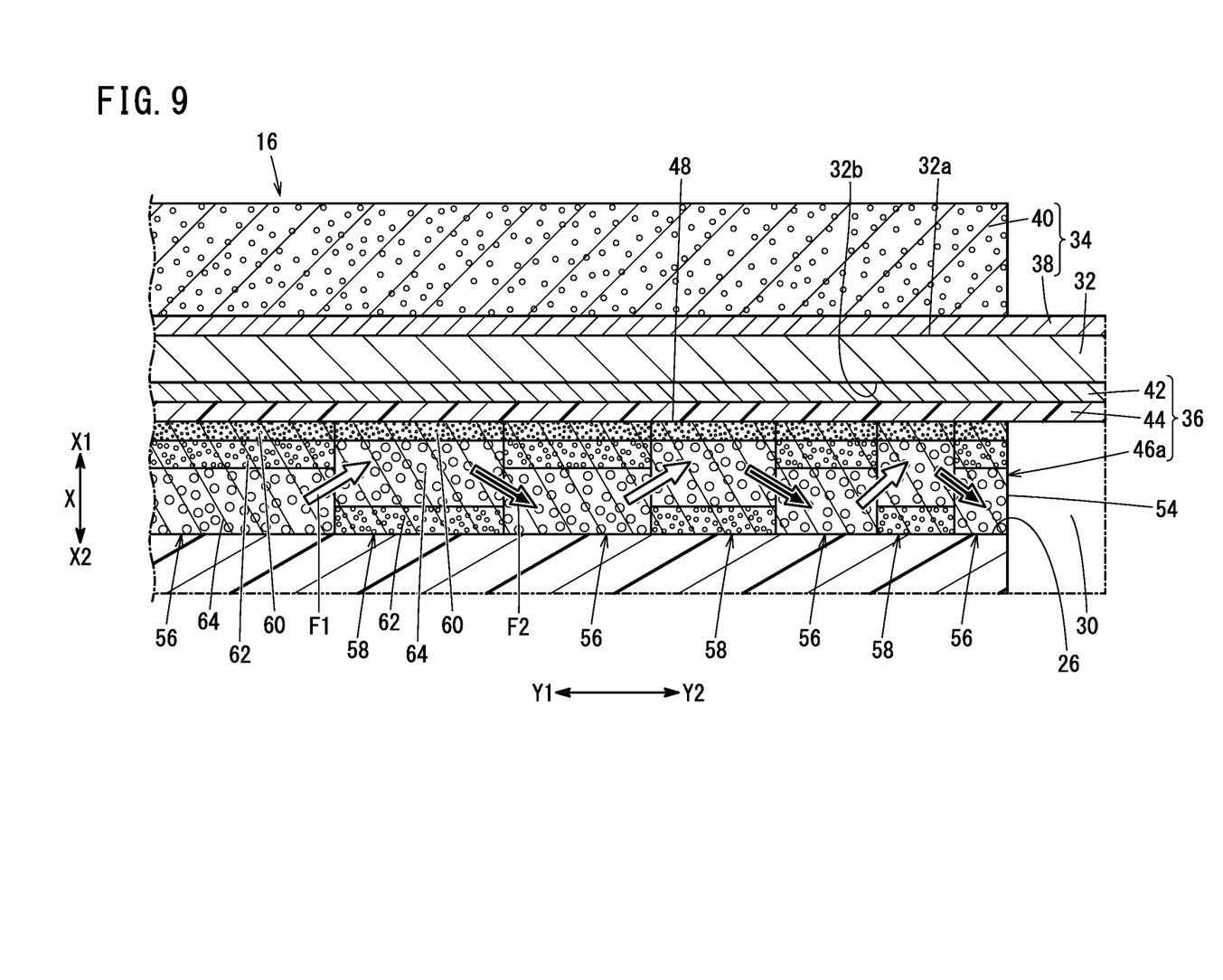
FIG. 9 is a second cross-sectional explanatory view of an anode current collector shown in FIG. 7.

Next, an anode current collector 46a according to a modified example will be described. In the modified example, the same components as those of the above-described anode current collector 46 are denoted by the same reference numerals, and detailed description thereof is omitted. As shown in FIGS. 7 to 9, the anode current collector 46a is configured in a manner so that the first width W1 of the plurality of first portions 56 and the second width W2 of the plurality of second portions 58 are gradually narrowed from the central portion of the anode current collector 46a toward the outer periphery (radially outward). In other words, the first width W1 and the second width W2 are gradually narrowed from the central portion of the anode current collector 46a toward the first end portion 52 (in the arrow Y1 direction). Further, the first width W1 and the second width W2 are gradually narrowed from the central portion of the anode current collector 46 toward the second end portion 54 (in the arrow Y2 direction).

The present modification has the following benefits.

The plurality of first portions 56 and the plurality of second portions 58 are formed in a manner so that the width of the first portions 56 and the second portions 58 along the direction the first portions 56 and the second portions 58 are arranged gradually decreases from the central portion of the anode current collector 46a toward the first end portion 52.

According to such a configuration, the number of occurrences of the first flow F1 and the second flow F2 at the outer peripheral portion of the anode current collector 46a can be made larger than the number of occurrences of the first flow F1 and the second flow F2 at the central portion of the anode current collector 46a. Thus, the liquid water can be further suppressed from staying between the outer peripheral portion of the anode current collector 46a and the outer peripheral portion of the electrolyte membrane 32.

The present invention is not limited to the above-described embodiments, and various configurations can be adopted therein without departing from the essence and gist of the present invention.

The present embodiments disclose the following contents.

Disclosed is an electrochemical compressor (10) including: an electrolyte membrane (32); a cathode electrode (34) provided on one surface (32a) of the electrolyte membrane; and an anode electrode (36) provided on another surface (32b) of the electrolyte membrane, wherein the anode electrode includes an anode catalyst layer (42) and an anode current collector (46, 46a), a voltage is applied between the cathode electrode and the anode electrode in a state in which hydrogen gas containing water is supplied to the anode current collector, whereby high-pressure hydrogen gas having pressure higher than the hydrogen gas is generated at the cathode electrode, the electrochemical compressor further comprising a flow path member (14) that allows the hydrogen gas to flow from a first end portion (52) to a second end portion (54) of an outer periphery of the anode current collector in a surface direction of the anode current collector, wherein the anode current collector includes a first surface (48) facing in a direction in which the anode catalyst layer is positioned, and a second surface (50) facing in a direction opposite to the direction in which the anode catalyst layer is positioned, the anode current collector includes a plurality of first portions (56) in each of which a first porous body (60), a second porous body (62), and a third porous body (64) are sequentially stacked from the first surface toward the second surface, and a plurality of second portions (58) in each of which the first porous body, the third porous body, and the second porous body are sequentially stacked from the first surface toward the second surface, a porosity of the second porous body is larger than a porosity of the first porous body, a porosity of the third porous body is larger than the porosity of the second porous body, and the plurality of first portions and the plurality of second portions are alternately arranged from the first end portion toward an inner side in the surface direction of the anode current collector.

In the electrochemical compressor, the thickness (D3) of the third porous body may be larger than the thickness (D2) of the second porous body in the stacking direction of the first porous body, the second porous body, and the third porous body.

In the electrochemical compressor described above, the plurality of first portions and the plurality of second portions may be formed in a manner so that the widths (W1, W2) of the first portion and the second portion along the arrangement direction gradually decrease from the central portion of the anode current collector toward the first end portion.

In the electrochemical compressor described above, each of the plurality of first portions may extend annularly, and each of the plurality of second portions may extend annularly.

The invention claimed is:

1. An electrochemical compressor comprising:
an electrolyte membrane;
a cathode electrode provided on one surface of the electrolyte membrane; and
an anode electrode provided on another surface of the electrolyte membrane, wherein the anode electrode includes an anode catalyst layer and an anode current collector, and
a voltage is applied between the cathode electrode and the anode electrode in a state in which a hydrogen gas containing water is supplied to the anode current collector, whereby a high-pressure hydrogen gas having pressure higher than the supplied hydrogen gas containing water is generated at the cathode electrode,
the electrochemical compressor further comprising a flow path member that allows the supplied hydrogen gas containing water to flow from a first end portion to a second end portion of an outer periphery of the anode current collector in a surface direction of the anode current collector,
wherein the anode current collector includes a first surface facing in a direction in which the anode catalyst layer is positioned, and a second surface facing in a direction opposite to the direction in which the anode catalyst layer is positioned,
the anode current collector includes
a plurality of first portions in each of which a first porous body, a second porous body, and a third porous body are sequentially stacked from the first surface toward the second surface, and
a plurality of second portions in each of which the first porous body, the third porous body, and the second porous body are sequentially stacked from the first surface toward the second surface,
a porosity of the second porous body is larger than a porosity of the first porous body,
a porosity of the third porous body is larger than the porosity of the second porous body, and
the plurality of first portions and the plurality of second portions are alternately arranged from the first end portion toward an inner side in the surface direction of the anode current collector.

2. The electrochemical compressor according to claim 1, wherein
the third porous body is thicker than the second porous body in a stacking direction of the first porous body, the second porous body, and the third porous body.

3. The electrochemical compressor according to claim 1, wherein
the plurality of first portions and the plurality of second portions are formed in a manner so that widths of the first portions and the second portions along an arrangement direction gradually decrease from a central portion of the anode current collector toward the first end portion.

4. The electrochemical compressor according to claim 1, wherein
each of the plurality of first portions extends annularly, and
each of the plurality of second portions extends annularly.

* * * * *